US011173792B2

(12) United States Patent
Park

(10) Patent No.: US 11,173,792 B2
(45) Date of Patent: Nov. 16, 2021

(54) CIRCULATION CHARGING SYSTEM FOR ELECTRIC VEHICLE

(71) Applicant: Sung Gyu Park, Busan (KR)

(72) Inventor: Sung Gyu Park, Busan (KR)

( * ) Notice: Subject to any disclaimer, the term of this patent is extended or adjusted under 35 U.S.C. 154(b) by 0 days.

(21) Appl. No.: 15/734,305

(22) PCT Filed: May 29, 2019

(86) PCT No.: PCT/KR2019/006452
§ 371 (c)(1),
(2) Date: Dec. 2, 2020

(87) PCT Pub. No.: WO2020/004820
PCT Pub. Date: Jan. 2, 2020

(65) Prior Publication Data
US 2021/0221237 A1 Jul. 22, 2021

(30) Foreign Application Priority Data
Jun. 26, 2018 (KR) .......................... 10-2018-0073257

(51) Int. Cl.
B60K 1/00 (2006.01)
B60L 50/61 (2019.01)
B60L 58/18 (2019.01)
B60L 50/52 (2019.01)
B60L 15/20 (2006.01)

(52) U.S. Cl.
CPC ............... *B60L 50/61* (2019.02); *B60L 15/20* (2013.01); *B60L 50/52* (2019.02); *B60L 58/18* (2019.02); *B60L 2240/421* (2013.01)

(58) Field of Classification Search
CPC .......... B60L 50/61; B60L 58/18; B60L 50/52; B60L 15/20; B60L 2240/421
USPC ....................................................... 180/65.1
See application file for complete search history.

(56) References Cited

FOREIGN PATENT DOCUMENTS

| JP | 2006-335190 A | 12/2006 |
|---|---|---|
| JP | 2012-147636 A | 8/2012 |
| KR | 20-0318811 Y1 | 7/2003 |
| KR | 10-2014-0013250 A | 2/2014 |
| KR | 10-2018-0024191 A | 3/2018 |
| KR | 10-1854017 B1 | 6/2018 |

*Primary Examiner* — Daniel Cavallari
*Assistant Examiner* — Dru Parries
(74) *Attorney, Agent, or Firm* — KORUS Patent, LLC; Seong Il Jeong

(57) ABSTRACT

The present invention relates to a circulation charging system for an electric vehicle, including: a first motor configured to be rotated by a predetermined driving current and provide driving force to an engine; a second motor having a generator; a main battery and a spare battery configured to be charged based on a voltage output from the generator and alternately supply driving power required for driving the first motor; a central storage unit configured to be charged based on the voltage output from the generator and provide a driving force for driving the second motor; a second auxiliary storage unit configured to be charged based on the voltage output from the generator; and a switching controller configured to perform control so that the battery power of the main battery and the battery power of the spare battery are alternately supplied as the driving power of the first motor.

3 Claims, 5 Drawing Sheets ized to 380 V through an on-board charger (OBC) of the electric vehicle, and then a battery is charged. This slow charging can use general household electricity, and thus the slow charging has advantages in that charging costs are relatively inexpensive and the size of the charger is also small compared to a fast charger.

CIRCULATION CHARGING SYSTEM FOR ELECTRIC VEHICLE

TECHNICAL FIELD

The present invention relates to a circulation charging system for an electric vehicle capable of extending the driving distance of an electric vehicle by circularly charging a pair of batteries that provide driving power to the electric vehicle.

BACKGROUND ART

An electric vehicle refers to a vehicle that uses a battery and an electric motor. Such an electric vehicle moves itself by rotating an electric motor using energy stored in a battery, and charges the battery from an internal or external power source.

Charging methods for electric vehicles are basically classified into two types: slow charging using alternating current (AC) power and rapid charging using direct current (DC) power.

In the slow charging using AC power, a general AC voltage of 220V is connected to an electric vehicle, the AC voltage is boosted to 380 V through an on-board charger (OBC) of the electric vehicle, and then a battery is charged. This slow charging can use general household electricity, and thus the slow charging has advantages in that charging costs are relatively inexpensive and the size of the charger is also small compared to a fast charger.

The rapid charging using DC power charges a battery without a separate charging device in an electric vehicle by using DC supplied to the electric vehicle. The rapid charging has an advantage in that a battery can be charged within a short time, but has a disadvantage in that charging can be performed only through electric vehicle supply equipment capable of supplying DC power.

Meanwhile, in electric vehicles, as the capacity of an installed battery increases, the distance that can be used after a single charge increases, but the time required for charging the battery increases.

When the purpose of an electric vehicle that is to be used as a means of transportation is taken into consideration, the electric vehicle must be equipped with a large-capacity battery so that the electric vehicle can travel a long distance at once. However, as the capacity of the battery increases, the charging time of the battery becomes longer, so that a problem arises in that there occurs the inconvenience in which the use of the electric vehicle is not free.

DISCLOSURE

Technical Problem

The present invention has been conceived to overcome the above-described problems, and an object of the present invention is to provide a circulation charging system for an electric vehicle that is capable of extending the driving distance of an electric vehicle by circularly charging a main battery and a spare battery that are used as the energy sources of an electric vehicle.

Technical Solution

In order to accomplish the above object, according to an aspect of the present invention, there is provided a circulation charging system for an electric vehicle, the circulation charging system including: a first motor mounted at a predetermined location of an electric vehicle, and configured to be rotated by a predetermined driving current and provide driving force to an engine of the electric vehicle; a second motor having a generator that operates in conjunction with the engine of the electric vehicle; a main battery and a spare battery configured to be charged based on a voltage output from the generator and alternately supply driving power required for driving the first motor; a central storage unit configured to be charged based on the voltage output from the generator and provide a driving force for driving the second motor; a second auxiliary storage unit configured to be charged based on the voltage output from the generator; and a switching controller configured to perform control so that battery power of the main battery and battery power of the spare battery are alternately supplied as driving power of the first motor.

According to another aspect of the present invention, there is provided a circulation charging system for an electric vehicle, the circulation charging system including: a motor power generation unit having a generator that operates in conjunction with an engine of the electric vehicle; a main battery and a spare battery configured to be charged based on a voltage output from the generator and alternately supply driving power required for driving the electric vehicle; an encoder configured to detect a rotating velocity of the generator; and a generator velocity controller configured to generate a control signal adapted to increase or decrease the rotating velocity of the generator according to whether or not the rotating velocity of the generator detected by the encoder falls within a preset velocity range.

Advantageous Effects

According to the present invention, the main battery and the spare battery are alternately used, unlike in the prior art in which the main battery is used preferentially and the spare battery is used as a spare only when the voltage of the main battery is lower than a threshold voltage, so that an advantage arises in that it may be possible to stably provide driving power for driving the driving motor.

Furthermore, according to the present invention, it may be possible to receive electric energy generated from the generator and charge the main battery and the spare battery while driving, and it may also be possible to reduce instant excessive fluctuation in energy when the main battery and the spare battery are charged, thereby providing an advantage in that the life of the main battery and the spare battery may be extended.

Moreover, according to the present invention, an advantage arises in that the operating velocity of the generator that receives driving force from the driving shaft to which the motor, the transmission, and the driving unit are connected and that generates power may be maintained without any significant fluctuation even when the transmission operation of the electric vehicle is performed.

BEST MODE

Figure 1:
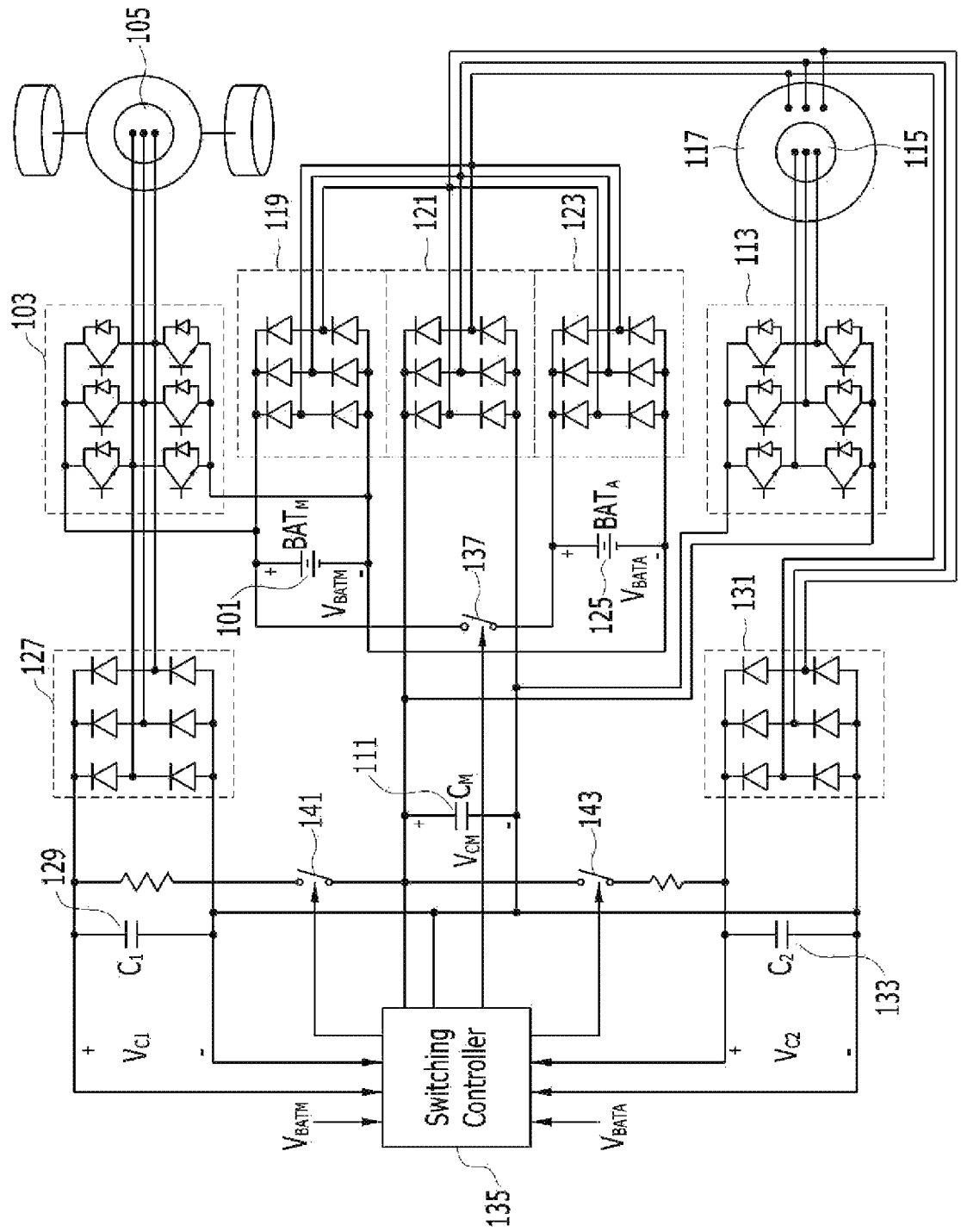
FIGS. 1 to 4 are circuit diagrams showing first, second, third, and fourth embodiments of the internal configuration of a circulation charging system for an electric vehicle, including first and second motors, according to the present invention, respectively.

A circulation charging system for an electric vehicle according to the present invention includes: a first motor mounted at a predetermined location of an electric vehicle, and configured to be rotated by a predetermined driving current and provide driving force to an engine of the electric vehicle; a second motor having a generator that operates in conjunction with the engine of the electric vehicle; a main battery and a spare battery configured to be charged based on a voltage output from the generator and alternately supply driving power required for driving the first motor; a central storage unit configured to be charged based on the voltage output from the generator and provide a driving force for driving the second motor; a second auxiliary storage unit configured to be charged based on the voltage output from the generator; and a switching controller configured to perform control so that battery power of the main battery and battery power of the spare battery are alternately supplied as driving power of the first motor.

The switching controller of the circulation charging system for an electric vehicle according to the present invention performs control so that the power of any one of the main battery and the spare battery is selectively supplied as the driving power of the first motor based on the voltage values of the main battery and the spare battery.

The switching controller of the circulation charging system for an electric vehicle according to the present invention performs control so that the battery power of a battery, which is one of the main battery and the spare battery and has a higher value, is supplied to the first motor when the voltage value or remaining battery level value of the main battery is lower than a preset first reference value.

The circulation charging system for an electric vehicle according to the present invention further includes: a first inverter connected to input terminals of the first motor, and configured to convert a DC voltage, supplied from one of the main battery and the spare battery, into an AC voltage and supply this AC voltage to the first motor; a second inverter connected to input terminals of the second motor, and configured to convert a DC voltage, supplied from the central storage unit, into an AC voltage and supply this AC voltage to the second motor; and a rectification unit connected to an output terminal of the generator and configured to rectify an AC generation voltage output from the generator.

A circulation charging system for an electric vehicle according to the present invention includes: a motor power generation unit having a generator that operates in conjunction with an engine of the electric vehicle; a main battery and a spare battery configured to be charged based on a voltage output from the generator and alternately supply driving power required for driving the electric vehicle; an encoder configured to detect a rotating velocity of the generator; and a generator velocity controller configured to generate a control signal adapted to increase or decrease the rotating velocity of the generator according to whether or not the rotating velocity of the generator detected by the encoder falls within a preset velocity range.

The circulation charging system for an electric vehicle according to the present invention further includes a switching controller configured to control whether to battery power of at least one of the main battery and the spare battery as the driving power based on a result of comparison between the rotating velocity of the generator and a preset reference velocity.

The circulation charging system for an electric vehicle according to the present invention further includes a first switch connected between the main battery and the spare battery and configured to allow the driving power to be supplied from at least one of the main battery and the spare battery, and, when the rotating velocity of the generator is lower than the preset reference velocity, the switching controller generates a control signal adapted to control the first switch to a conductive state so that battery power of the main battery and battery power of the spare battery are supplied as the driving power together.

The motor power generation unit of the circulation charging system for an electric vehicle according to the present invention includes: a DC motor configured to receive predetermined driving power and operate; a generator configured to generate and output a predetermined generation voltage based on a rotating force of the DC motor; a transmission configured to change the rotating force of the DC motor according to a predetermined gear ratio and output the resulting rotating force; and a subordinate module configured to transfer the torque, output from the transmission, to the driving shaft and generator of the electric vehicle and perform control such that the rotating velocity of the generator is maintained within a preset velocity range.

The subordinate module of the circulation charging system for an electric vehicle according to the present invention includes: a transfer unit configured to transfer the torque, output from the transmission, to the driving shaft of the electric vehicle; and a velocity maintenance unit configured to, when receiving a control signal generated by the generator velocity controller after receiving the output torque from the transfer unit, perform control to increase or decrease the rotating velocity of the generator based on the received control signal such that the rotating velocity of the generator is maintained within a preset velocity range.

The generator velocity controller of the circulation charging system for an electric vehicle according to the present invention receives feedback on information about the rotating velocity detected by the encoder and repeatedly generates the control signal until the rotating velocity reaches the preset velocity range.

MODE FOR INVENTION

Specific items, including problems to be solved, means for solving the problems, and effects of the invention as described above, are included in the following examples and drawings. Advantages and features of the present invention, and a method for achieving the same will be apparent with reference to the embodiments that will be described below in detail in conjunction with the accompanying drawings. The same reference numerals refer to the same components throughout the specification.

FIGS. 1 to 4 are circuit diagrams showing first, second, third and fourth embodiments of the internal configuration of a circulation charging system for an electric vehicle, including first and second motors, according to the present invention, respectively.

The circulation charging systems for an electric vehicle according to the first, second, third and fourth embodiments of the present invention will be described with reference to FIGS. 1 to 4 below.

First, referring to FIG. 1, the circulation charging system for an electric vehicle according to the first embodiment of the present invention includes a first motor 105, a second motor 115, a main battery 101, a spare battery 125, a central storage unit 111, a first auxiliary storage unit 129, a second auxiliary storage unit 133, a first inverter 103, a second inverter 113, a rectification unit 118, and a switching controller 135.

The first motor 105 is mounted at a predetermined location of an electric vehicle, and is rotated by a predetermined driving current and provides driving force to the engine of the electric vehicle.

The second motor 115 has a generator 117 that operates in conjunction with the engine of the electric vehicle.

In this case, the generator 117 is integrated with the rotating shaft of the second motor 115, and may generate and output a generation voltage based on the rotating force of the second motor 115.

In this case, it is preferable that the first motor 105 and the second motor 115 be three-phase AC motors that are operated by AC power.

The central storage unit 111 is charged based on the voltage output from the generator 117 and provides a driving force for driving the second motor 115.

The second auxiliary storage unit 133 is charged based on the voltage output from the generator 117.

In this case, the central storage unit 111, the first auxiliary storage unit 129, and the second auxiliary storage unit 133 may be provided as super capacitors having a large capacitance.

Such a super capacitor enables rapid charging and discharging using the simple movement of ions to an electrode-electrolyte interface or a charging phenomenon based on a surface chemical reaction, and has high charging/discharging efficiency and semi-permanent cycle life characteristics.

The main battery 101 and the spare battery 125 are charged based on the voltage output from the generator 117 and alternately supply driving power required for driving the first motor 105.

In this case, a first switch 137 configured to allow driving power required for driving the first motor 105 to be supplied from at least one of the main battery 101 and the spare battery 125 may be in the state of being connected between the main battery 101 and the spare battery 125.

For example, referring to FIG. 1, the first switch 137 is configured such that one end thereof is connected to the main battery 101 and the other end thereof is connected to the spare battery 125, and is placed on the power supply line of the first motor 105 and the spare battery 125.

In other words, the main battery 101 is directly connected to the input terminals of the first motor 105, whereas the spare battery 125 is indirectly connected to the first motor 105 depending on whether the first switch 137 is opened or closed.

In this case, the main battery and the spare battery may receive and be charged with the electric energy generated by the generator while driving, and instant, excessive energy fluctuation may be reduced when the main battery and the spare battery are charged, thereby extending the life of the main battery and the spare battery.

The first inverter 103 is connected to the input terminals of the first motor 105, and converts a DC voltage, supplied from one of the main battery 101 and the spare battery 125, into an AC voltage and supplies the AC voltage to the first motor 105.

For example, referring to FIG. 1, the output terminals of the first inverter 103 are connected to the first motor 105, and the input terminals of the first inverter 103 are connected to both ends of the main battery 101.

In this case, the first switch 137 configured such that one end thereof is connected to the positive (+) terminal of the main battery 101 and the other end thereof is connected to the positive (+) terminal of the spare battery 125.

The second inverter 113 is connected to the input terminals of the second motor 115, and converts the DC voltage, supplied from the central storage unit 111, into an AC voltage and supplies the AC voltage to the second motor 115.

For example, referring to FIG. 1, the output terminals of the second inverter 113 are connected to the second motor 115, whereas the input terminals of the second inverter 113 are connected to both ends of the central storage unit 111.

In this case, the first inverter 103 and the second inverter 113 may be half-bridge type three-phase voltage inverters in each of which three pairs of switching elements are provided and each pair of switching elements are connected in series to each of the three-phase coils U, V, and W of the first motor 105 or second motor 115.

In this case, each of the switching elements may be any one of a transistor, a MOS field-effect transistor (MOSFET), and an insulated gate bipolar transistor (IGBT).

The rectification unit 118 is connected to the output terminal of the generator 117 and rectifies the AC generation voltage output from the generator 117.

More specifically, the rectification unit 118 includes: a first rectifier 119 configured to rectify the AC voltage output from the generator 117 and output it to the main battery 101; a second rectifier 121 configured to rectify the AC voltage output from the generator 117 and output it to the central storage unit 111; a third rectifier 123 configured to rectify the AC voltage output from the generator 117 and output it to the spare battery 125; and a fourth rectifier 131 configured to rectify the AC voltage output from the generator 117 and output it to the second auxiliary storage unit 133.

In this case, the first rectifier 119, the second rectifier 121, the third rectifier 123, and the fourth rectifier 131 may be three phase full-wave rectification circuits in each of which three pairs of switching elements are provided and each pair of switching elements are connected in series to each of the three-phase coils U, V, and W of the generator 117.

In this case, the unidirectional switching element may be any one of a diode, a thyristor, and a gate turn-off thyristor (GTO).

For example, referring to FIG. 1, the first rectifier 119 may be in a state in which a common node, to which both ends of the three pairs of unidirectional switching elements are connected in common, is connected to both ends of the main battery 101, and the second rectifier 121 may be in a state in which a common node, to which both ends of the three pairs of unidirectional switching elements are connected in common, is connected to both ends of the central storage unit 111.

Furthermore, the third rectifier 123 may be in a state in which a common node, to which both ends of three pairs of unidirectional switching elements are connected in common, is connected to both ends of the spare battery 125, and the fourth rectifier 131 may be in a state in which a common node, to which both ends of the switching element are connected in common, may be connected to both ends of the second auxiliary storage unit 133.

Meanwhile, there may be further included a fifth rectifier 127 configured to rectify the AC voltage output from the first inverter 103 and output it to the first auxiliary storage unit 129.

In this case, the fifth rectifier 127 may be a three-phase full-wave rectification circuit in which three pairs of unidirectional switching elements are provided and one pair of unidirectional switching elements are connected in series to a corresponding output terminal of the first inverter 103 corresponding to each of the three-phase coils U, V and W of the first motor 105.

In this case, each of the unidirectional switching elements may be any one of a diode, a thyristor, and a gate turn-off thyristor (GTO).

The second switch 141 is connected between the central storage unit 111 and the first auxiliary storage unit 129 and determines whether to supply the charging power of the first auxiliary storage unit 129 to the central storage unit 111.

The third switch 143 is connected between the central storage unit 111 and the second auxiliary storage unit 133 and determines whether to supply the charging power of the second auxiliary storage unit 133 to the central storage unit 111.

For example, referring to FIG. 1, the second switch 141 is configured such that one end thereof is connected between the upper common node of the fifth rectifier 127 and the first auxiliary storage unit 129 and the other end thereof is connected to the (+) terminal of the central storage unit 111, and is disposed on a power supply line between the first auxiliary storage unit 129 and the central storage unit 111.

Furthermore, the third switch 143 is configured such that one end thereof is connected to the other end of the second switch 141 and the other end thereof is connected between the upper common node of the fourth rectifier 131 and one end of the second auxiliary storage unit 133, and is disposed on a power supply line between the second auxiliary storage unit 133 and the central storage unit 111.

The switching controller 135 functions to control the supply of power for the driving of the first motor 105 and the charging of the central storage unit 111 by controlling the opening and closing of the first switch 137, the second switch 141, and the third switch 143.

In this case, the switching controller 135 controls the opening and closing of the first switch 137 in order to supply the power of any one of the main battery 101 and the spare battery 125 as the driving power of the first motor 105 based on the voltage values of the main battery 101 and the spare battery 125.

More specifically, the switching controller 135 controls the opening and closing of the first switch 137 in order to supply the battery power of a battery, which is one of the main battery 101 and the spare battery 125 and has a higher voltage value, to the first motor 105 when the voltage value of the main battery 101 is lower than a preset first reference value V1.

Furthermore, the switching controller 135 according to the present invention is not limited only to the above-described features. When the voltage value of the main battery 101 is equal to or higher than the preset first reference value V1, the switching controller 135 may supply the battery power of the main battery 101 as the driving power of the first motor 105, and may perform control so that the spare battery 125 is charged with the voltage output from the generator 117 preferentially over the main battery 101 while the driving power is supplied. When the voltage value of the main battery 101 is lower than the first reference value V1, the switching controller 135 may perform control so that the battery power of the spare battery 125 is supplied as the driving power of the first motor 105.

In this case, unlike the conventional case in which the main battery is used as a spare only when the voltage of the main battery is lower than a threshold voltage, the main battery and the spare battery are used alternately, and thus driving power for driving the driving motor may be stably provided.

Meanwhile, the switching controller 135 may control the opening and closing of the second switch 141 and the third switch 143 in order to supply the charging power of any one of the first auxiliary storage unit 129 and the second auxiliary storage units 133 to the central storage unit 111 based on the voltage values of the central storage unit 111, the first auxiliary storage unit 129, and the second auxiliary storage unit 133.

For example, when the voltage value charged in the central storage unit 111 is lower than a preset second reference value V2, the switching controller 135 may control the opening and closing of the second switch 141 and the third switch 143 in order to charge the central storage unit 111 with the power charged in a storage unit that is one of the first auxiliary storage unit 129 and the second auxiliary storage unit 133 and has a higher voltage value.

Figure 2:
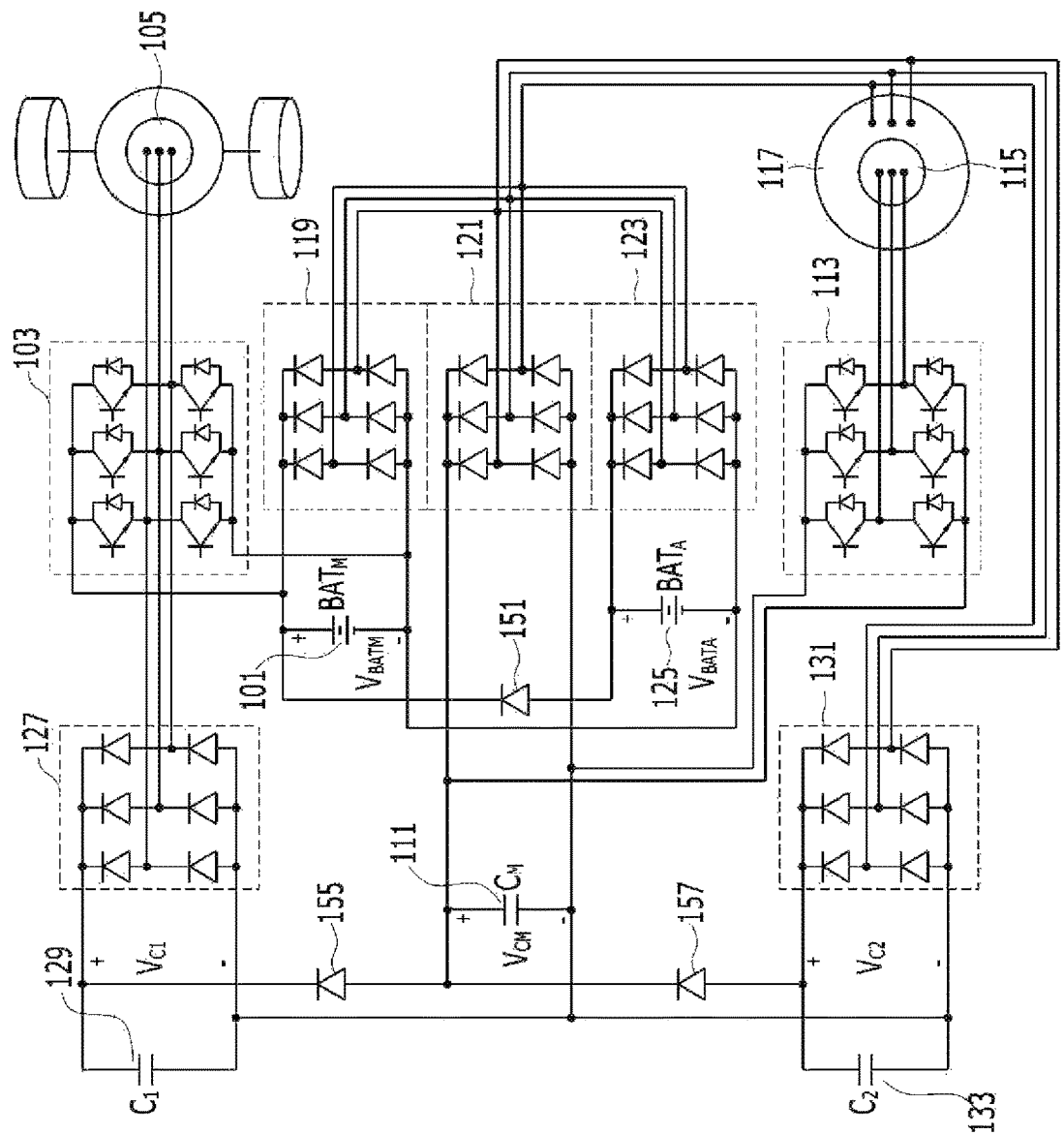

Next, referring to FIG. 2, the circulation charging system for an electric vehicle according to the second embodiment of the present invention includes the first motor 105, the second motor 115, the main battery 101, the spare battery 125, the central storage unit 111, the first auxiliary storage unit 129, the second auxiliary storage unit 133, the first inverter 103, the second inverter 113, and the rectification unit 118, which correspond to the remaining components excluding the first to third switches 137, 141 and 143 and the switching controller 135 from the components set forth in the description given with reference to FIG. 1. Since detailed descriptions of the respective components are the same as described above, they will be omitted.

However, in the case of the circulating charging system for an electric vehicle according to the second embodiment of the present invention shown in FIG. 2, a first diode 151, a second diode 155, and a third diode 157 are disposed at positions corresponding to the first switch 137, the second switch 141, and the third switch 143, respectively.

In this case, each of the first diode 151, the second diode 155, and the third diode 157 may include not only a general diode but also a thyristor and a gate turn-off thyristor (GTO).

In this case, the first diode 151 is configured such that one end thereof is connected to the main battery 101 and the other end thereof is connected to the spare battery 125, and is disposed on the power supply line of the first motor 105 and the spare battery 125.

In this case, the second diode 155 is configured such that one end thereof is connected between the upper common node of the fifth rectifier 127 and the first auxiliary storage unit 129 and the other end thereof is connected to the positive (+) terminal of the central storage unit 111, and is disposed on a power supply line between the first auxiliary storage unit 129 and the central storage unit 111.

In this case, the third diode 157 is configured such that one end thereof is connected to the other end of the second diode 155 and the other end thereof is connected between the upper common node of the fourth rectifier 131 and one end of the second auxiliary storage unit 133, and is disposed on a power supply line between the second auxiliary storage unit 133 and the central storage unit 111.

In other words, in this case, according to the result of relative comparison between the voltage value charged in the central storage unit 111 and the voltage value charged in each of the first auxiliary storage unit 129 or the second auxiliary storage unit 133, charging power is supplied from at least one auxiliary storage unit having a voltage higher than that of the central storage unit 111, and immediately charging is performed.

In the same manner, in the case of the main battery 101, the battery power having a higher voltage value is supplied to the first motor 105 according to the result of relatively comparison between the voltage value of the main battery 101 and the voltage value of the spare battery 125.

Figure 3:
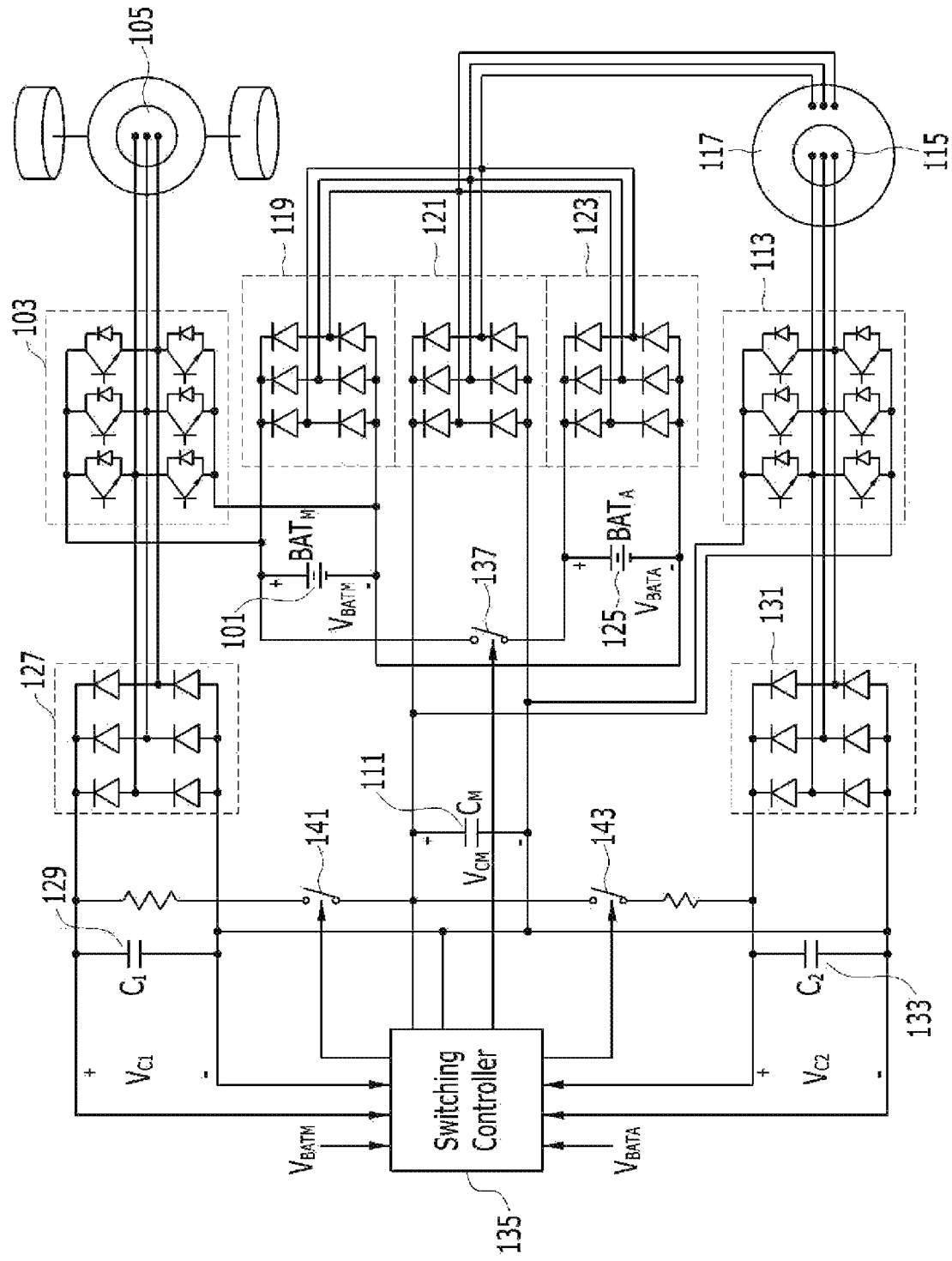

Next, referring to FIG. 3, the circulation charging system for an electric vehicle according to the third embodiment of the present invention includes all the components described above in the description given with reference to FIG. 1, but the fourth rectifier 131 may be connected to the input terminal of the second motor 115 instead of being connected to the output terminal of the generator 117.

In this case, the fourth rectifier 131 may be a three-phase full-wave rectification circuit in which three pairs of unidirectional switching elements are provided and one pair of unidirectional switching elements are connected in series to a corresponding output terminal of the second inverter 113 corresponding to each of the three-phase coils U, V and W of the second motor 115.

Figure 4:
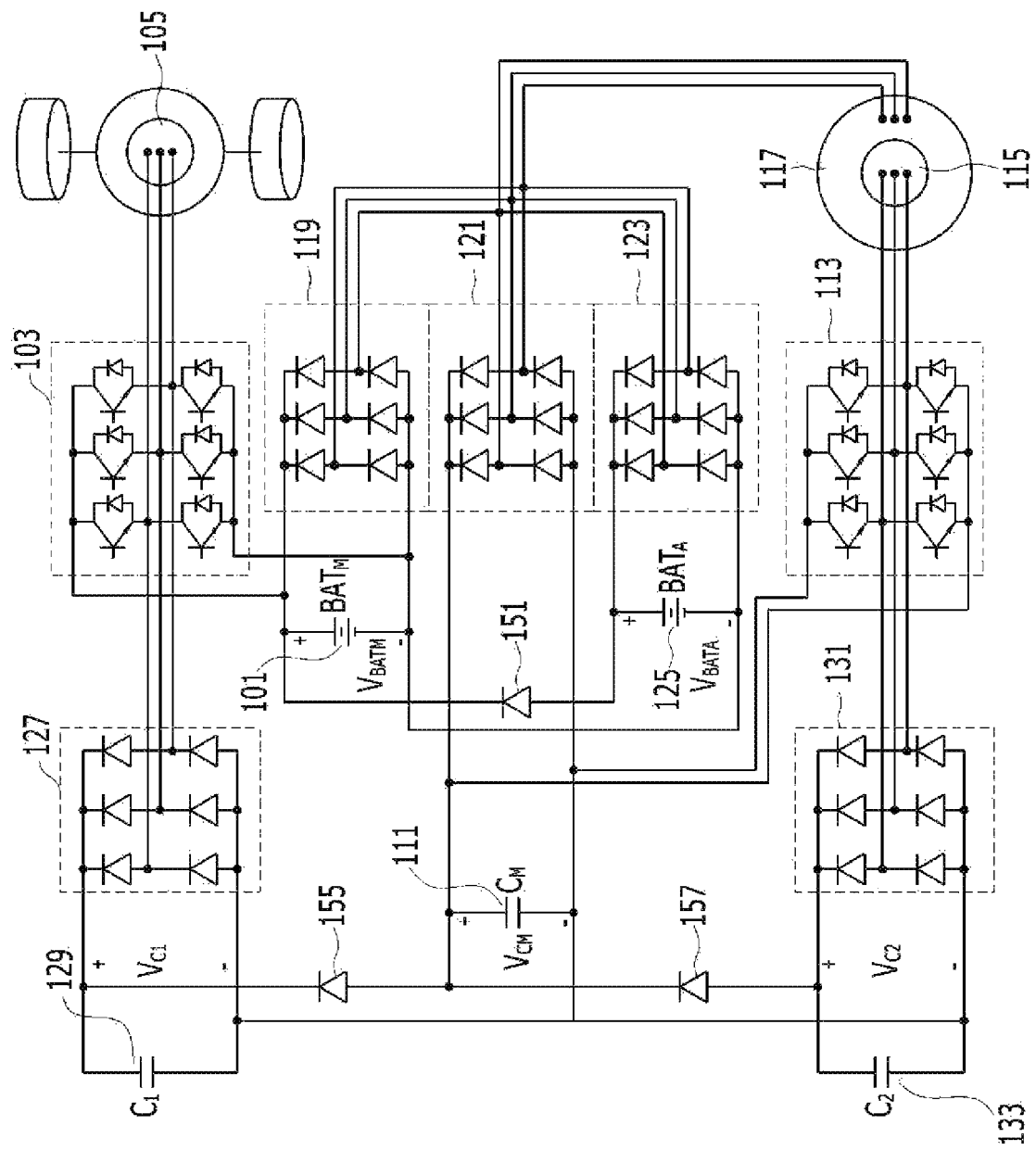

Next, referring to FIG. 4, the circulation charging system for an electric vehicle according to the fourth embodiment of the present invention includes all the components described above in the description given with reference to FIG. 2, but the fourth rectifier 131 may be connected to the input terminal of the second motor 115 instead of being connected to the output terminal of the generator 117, as described above in conjunction with FIG. 3.

In this case, the fourth rectifier 131 may be a three-phase full-wave rectification circuit in which three pairs of unidirectional switching elements are provided and one pair of unidirectional switching elements are connected in series to a corresponding output terminal of the second inverter 113 corresponding to each of the three-phase coils U, V and W of the second motor 115.

Figure 5:
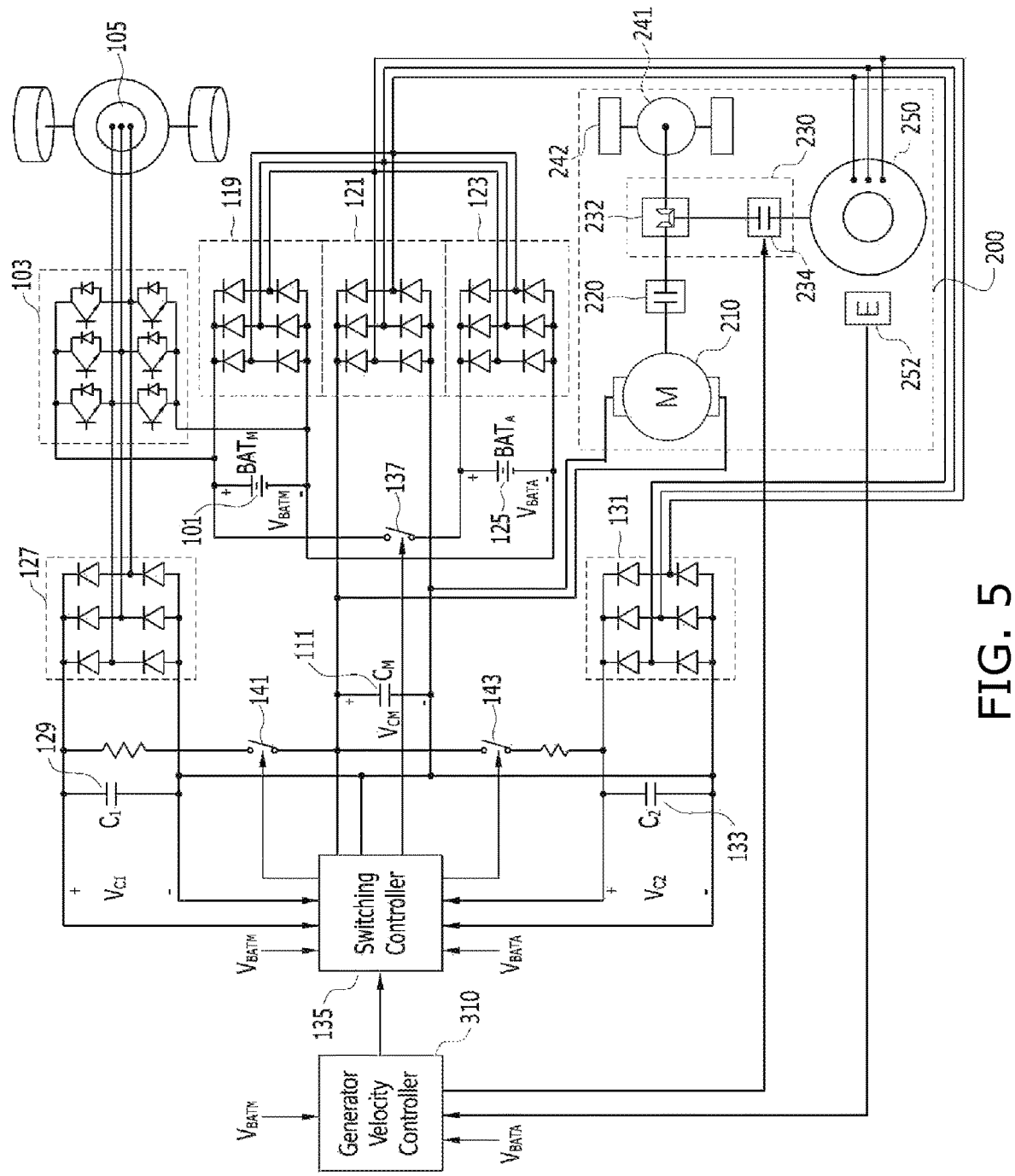
FIG. 5 is a circuit diagram showing a fifth embodiment of the internal configuration of a circulation charging system for an electric vehicle, including a motor power generation unit, according to the present invention.

FIG. 5 is a circuit diagram showing the fifth embodiment of the internal configuration of a circulation charging system for an electric vehicle, including a motor power generation unit, according to the present invention.

Referring to FIG. 5, a circulation charging system for an electric vehicle according to the fifth embodiment of the present invention will be described below. The circulation charging system for an electric vehicle according to the fifth embodiment of the present invention includes a motor power generation unit 200, a main battery 101, a spare battery 125, an encoder 252, a generator velocity controller 310, and a switching controller 135.

The motor power generation unit 200 has a generator 117 that operates in conjunction with the engine of an electric vehicle.

More specifically, the motor power generation unit 200 may include: a DC motor 210 configured to receive predetermined driving power and operate; a generator 250 configured to generate and output a predetermined generation voltage based on the rotating force of the DC motor 210; a transmission 220 configured to change the rotating force of the DC motor 210 according to a predetermined gear ratio and output the resulting rotating force; and a subordinate module 230 configured to transfer the torque, output from the transmission 220, to the driving shaft 241 and generator 250 of the electric vehicle and perform control such that the rotating velocity of the generator 250 is maintained within a preset velocity range.

In this case, both ends of the DC motor 210 may be connected to both ends of the central storage unit 111, and the DC motor 210 may include a brushless DC motor (BLDG).

In this case, a first rectifier 119, a second rectifier 121, a third rectifier 123, and a fourth rectifier 131 may be connected to the output terminals of the generator 250, respectively. Each of the rectifiers 119, 121, 123 and 131 may be a three-phase full-wave rectification circuit in which three pairs of unidirectional switching elements are provided and one pair of unidirectional switching elements are connected in series to each of the three-phase coils U, V and W of the generator 117, as described above.

In this case, the subordinate module 230 includes: a transfer unit 232 configured to transfer the torque, output from the transmission 220, to the driving shaft 241 of the electric vehicle; and a velocity maintenance unit 234 configured to, when receiving a control signal generated by the generator velocity controller 310 after receiving the output torque from the transfer unit 232, perform control to increase or decrease the rotating velocity of the generator 250 based on the received control signal such that the rotating velocity of the generator 250 is maintained within a preset velocity range.

For example, the velocity maintenance unit 234 may include a velocity reducer or a velocity increaser capable of adjusting a gear ratio according to an external signal.

In general, a driving system for a vehicle has a structure configured in the order a 'motor-transmission-driving unit,' whereas a driving system for an electric vehicle according to the present invention includes the subordinate module 230 between the transmission 220 and the driving shaft 241 corresponding to the driving unit. The driving system for an electric vehicle according to the present invention is characterized in that feedback control for the rotating velocity is repeatedly performed using the electric energy generated from the generator 250 connected to the subordinate module 230 until the rotating velocity of the generator 250 reaches a velocity within a certain velocity range.

In this case, the operating velocity of the generator 250 that receives driving force from the drive shaft 241 to which the motor 210, the transmission 220 and the driving unit are connected and that generates power may be maintained without any significant fluctuation even when the transmission operation of the electric vehicle is performed.

The main battery 101 and the spare battery 125 are charged based on the voltage output from the generator 250, and alternately supply driving power required for driving the electric vehicle.

In this case, a first switch 137 configured to allow the driving power to be supplied from at least one of the main battery 101 and the spare battery 125 may be connected between the main battery 101 and the spare battery 125.

In this case, the first inverter 103 is connected to the input terminal of the first motor 105, and coverts the DC voltage, supplied from any one of the main battery 101 and the spare battery 125, into a three-phase AC voltage and supplies the AC voltage to the first motor 105.

For example, referring to FIG. 5, the first switch 137 is configured such that one end thereof is connected to the main battery 101 and the other end thereof is connected to the spare battery 125, and is disposed on the power supply line of the first motor 105 and the spare battery 125. The output terminals of the first inverter 103 are connected to the first motor 105, and the input terminals of the first inverter 103 are connected to both ends of the main battery 101.

The encoder 252 is intended to detect the rotating velocity of the generator 250, and is attached to the generator 250 and configured such that the rotating shaft of the generator 250 is inserted into the encoder 252 and detects the rotating velocity of the generator 250.

The generator velocity controller 310 performs control so that the rotating velocity of the generator 117 is kept constant based on the rotating velocity of the generator 117 detected by the encoder 252 and the voltage values of the main battery 101 and the spare battery 125.

The reason for this is to take into consideration the voltage values of the main battery 101 and the spare battery 125 in that the main battery 101 and the spare battery 125 are charged by the voltage output from the generator 117, so that when the voltage values of the main battery 101 and the spare battery 125 fall below a preset threshold value, the amount of power output from the generator 117 needs to be increased, and thus the rotating velocity of the generator 117 will be increased.

In this case, the generator velocity controller 310 may generate a control signal adapted to increase or decrease the rotating velocity of the generator 250 according to whether or not the rotating velocity of the generator 250 detected by the encoder 252 falls within a preset velocity range, and may then transmit the generated control signal to the velocity maintenance unit 234.

In this case, the generator velocity controller 310 receives feedback on information about the rotating velocity, detected by the encoder 252, in real time and generates the control signal. As the feedback is repeated, the control signal may be sequentially and repeatedly generated.

The switching controller 135 controls whether to supply the power of at least one of the main battery 101 and the spare battery 125 as the driving power based on the rotating velocity of the generator 250.

In this case, the switching controller 135 controls the opening and closing of the first switch 137 so that the battery power of the main battery 101 and the battery power of the spare battery 125 are supplied as the driving power together based on the result of comparison between the rotating velocity of the generator 250 and a preset reference velocity $V_{ref}$.

More specifically, when the rotating velocity of the generator 250 is lower than the preset reference velocity $V_{ref}$, the switching controller 135 generates a control signal adapted to control the first switch 137 to a conductive state so that battery power of the main battery 101 and the battery power of the spare battery 125 are supplied as the driving power together.

As described above, the present invention has been described in detail through the preferred embodiments, but the present invention is not limited thereto and may be implemented in various manners within the scope of the claims.

In particular, since the above description somewhat broadly describes the features and technical advantages of the present invention so that the claims of the invention to be described later can be better understood, it should be recognized by those skilled in the art that the concept and specific embodiments of the present invention described above may be used immediately as a basis for designing or modifying other shapes for carrying out purposes similar those of to the present invention.

Furthermore, it will be understood that the above-described embodiments are merely embodiments according to the present invention and the present invention may be implemented in variously modified and altered forms within the scope of the technical spirit of the present invention by those of ordinary skill in the art. Therefore, the disclosed embodiments should be taken into consideration from a descriptive point of view, not a restrictive point of view. These various modifications and alterations also appear in the claims of the present invention as falling within the scope of the technical spirit of the present invention. All differences within the range equivalent thereto should be construed as being included in the present invention.

INDUSTRIAL APPLICABILITY

The present invention discloses a circulation charging system for an electric vehicle that is capable of extending the driving distance of an electric vehicle by circularly charging a pair of batteries that provide driving power to the electric vehicle.

The invention claimed is:

1. A circulation charging system for an electric vehicle, the circulation charging system comprising:
   a motor power generation unit, in a state of having a generator that operates in conjunction with an engine of the electric vehicle, including:
      a DC motor configured to receive predetermined driving power and operate;
      the generator configured to generate and output a predetermined generation voltage based on a rotating force of the DC motor;
      a transmission configured to change the rotating force of the DC motor according to a predetermined gear ratio and output the resulting rotating force; and
      a subordinate module configured to transfer a torque, output from the transmission, to the driving shaft and generator of the electric vehicle and perform control such that the rotating velocity of the generator is maintained within a preset velocity range;
   a main battery and a spare battery configured to be charged based on a voltage output from the generator and alternately supply driving power required for driving the electric vehicle;
   an encoder configured to detect a rotating velocity of the generator; and
   a generator velocity controller configured to generate a control signal adapted to increase or decrease the rotating velocity of the generator based on the rotating velocity of the generator and voltage values of the main battery and the spare battery, and also configured to receive feedback on information about the rotating velocity detected by the encoder in real time and sequentially and repeatedly generate the control signal until the rotating velocity reaches the preset velocity range;
   wherein the subordinate module comprises:
   a transfer unit configured to transfer the torque, output from the transmission, to the driving shaft of the electric vehicle; and
   a velocity maintenance unit configured to, when receiving a control signal generated by the generator velocity controller after receiving the output torque from the transfer unit, perform control to increase or decrease the rotating velocity of the generator by adjusting a gear ratio between the transfer unit and the generator based on the received control signal such that the rotating velocity of the generator is maintained within the preset velocity range.

2. The circulation charging system of claim 1, further comprising a switching controller configured to control whether to battery power of at least one of the main battery and the spare battery as the driving power based on a result of comparison between the rotating velocity of the generator and a preset reference velocity.

3. The circulation charging system of claim 2, further comprising a first switch connected between the main battery and the spare battery and configured to allow the driving power to be supplied from at least one of the main battery and the spare battery;
- wherein when the rotating velocity of the generator is lower than the preset reference velocity, the switching controller generates a control signal adapted to control the first switch to enter a conductive state so that battery power of the main battery and battery power of the spare battery are supplied as the driving power together.

* * * * *